(12) United States Patent
Eberbach et al.

(10) Patent No.: US 7,827,447 B2
(45) Date of Patent: Nov. 2, 2010

(54) SLIDING WINDOW MECHANISM FOR DATA CAPTURE AND FAILURE ANALYSIS

(75) Inventors: Andrew M. Eberbach, Raleigh, NC (US); Daniel E. Jemiolo, Cary, NC (US); Steven M. Miller, Cary, NC (US); Balan Subramanian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 11/620,637

(22) Filed: Jan. 5, 2007

(65) Prior Publication Data
US 2008/0168242 A1    Jul. 10, 2008

(51) Int. Cl.
*G06F 11/00* (2006.01)
(52) U.S. Cl. .......................... 714/45; 714/47
(58) Field of Classification Search ................ 714/47, 714/20, 45, 48
See application file for complete search history.

(56) References Cited

U.S. PATENT DOCUMENTS

| | | | |
|---|---|---|---|
| 5,790,781 A * | 8/1998 | Cox et al. ...................... | 714/47 |
| 6,023,453 A | 2/2000 | Ruutu et al. | |
| 6,049,798 A | 4/2000 | Bishop et al. | |
| 6,370,520 B1 | 4/2002 | Ruutu et al. | |
| 6,438,101 B1 | 8/2002 | Kalampoukas et al. | |
| 6,924,827 B1 | 8/2005 | Gulati et al. | |
| 2005/0246590 A1 * | 11/2005 | Lancaster ..................... | 714/47 |
| 2007/0179791 A1 * | 8/2007 | Ramesh et al. ................ | 705/1 |
| 2008/0126881 A1 * | 5/2008 | Bruckhaus ................... | 714/47 |
| 2008/0147357 A1 * | 6/2008 | Truter ....................... | 702/186 |

OTHER PUBLICATIONS

Scarlett, K., Common Base Event best practices: Getting it Right the first time, Apr. 11, 2006, http://www-128.ibm.com/developerworks/autonomic/library/ac-cbebp.html.
Biazetti et al., Achieving complex event processing with Active Correlation Technology, Nov. 15, 2005, http://www-128.ibm.com/developerworks/autonomic/library/ac-acact/index.html.

(Continued)

*Primary Examiner*—Scott T Baderman
*Assistant Examiner*—Sarai Butler
(74) *Attorney, Agent, or Firm*—Ojanen Law Offices; Karuna Ojanen (57) ABSTRACT

A computerized method, program product, and an autonomic data processing system for archiving real-time log data immediately upon the occurrence of an event. An application is executing and a logging application is obtaining real-time log data. The real-time log data is temporarily retained in a memory and when the memory fills, the real-time log data is archived to a longer-term memory. Upon archival, selected parameters of the real-time log data is saved. When an event occurs that is considered significant meaning that an aspect of the data processing system is impacted by or is indicative of the event, an information level module immediately adjusts the level of information of the selected parameters archived to the longer-term memory, allowing for selected levels to be retained for future analysis. As part of an autonomic computer system, the information levels can be adjusted for learning about specific events and the behavior of the data processing system.

20 Claims, 10 Drawing Sheets

OTHER PUBLICATIONS

Perazolo, M., Symptoms deep dive, Part 1: The autonomic computing symptoms format, Oct. 18, 2005, http://www-128.ibm.com/developerworks/autonomic/library/ac-symptom1/index.html.

Log Files, Apache HTTP Server Version 1.3, Jul. 22, 2005, http://httpd.apache.org/docs/1.3/logs/html.

Babcock et al., Operator scheduling in data stream systems, The VLDB Journal, Sep. 14, 2004, pp. 333-353, vol. 13, Springer-Verlag.

Crowell, Event Correlation and Root Cause Analysis, Mar. 2004, http://www3.ca.com/Files/WhitePapers/event_correlation_and_root_cause_analysis.pdf.

Qiao et al., Supporting Sliding Wndow Queries for Continuous Data Streams, 15th Int'l Conf Sci Stat Database Mgmt (SSDBM'03), Jul. 9-11, 2003, pp. 85-94, IEEE Computer Society.

Babcock et al., Maintaining Variance and k-Medians over Data Stream Windows, Proc. 20th ACM SIGMOD-SIGACT-SIGART Symposium, Jun. 9-12, 2003, pp. 234-243.

Krasic et al., Quality-Adaptive Media Streaming by Priority Drop, Proc. 13th Int'l Workshop on Network and Operating Systems, Jun. 1-3, 2003, pp. 112-121, ACM.

Tiffany, A Survey of Event Correlation Techniques and Related Topics, May 3, 2002, http://www.cc.gatech.edu/fac/Russell.Clark/papers/tiffany-netman.html.

Floyd et al., A Reliable Multicast Framework for Light-Weight Session and Application Level Framing, IEEE/ACM Trans. Networking, Dec. 1997, vol. 5, No. 6, pp. 784-803.

* cited by examiner

SLIDING WINDOW MECHANISM FOR DATA CAPTURE AND FAILURE ANALYSIS

RELATED INVENTIONS

This application is related to Ser. No. 11/620,649 entitled ADJUSTING SLIDING WINDOW PARAMETERS FOR INTELLIGENT EVENT ARCHIVING AND FAILURE ANALYSIS, commonly owned by the assignee herein, filed on the same day herewith, and which is incorporated by reference in its entirety.

BACKGROUND OF THE INVENTION

Field of the Invention

This invention relates to the field of autonomic computer processing and more particularly relates to dynamically adjusting the level and the historical amount of log data archived during specific processing events and before failure of a computer system.

As the world increasingly relies on computers to undertake and accomplish important complicated tasks, the field of information technology (IT) of networked computers becomes ever more important. An IT infrastructure is a collection of interdependent components including computing systems, networking devices, databases and applications. Within the set of infrastructure components are multiple versions of hardware and software products from different companies connected with a multitude of networking technologies. To make it even more complex, each business environment is different from the next; there is no standard set of components configured in a standard way. The devices, firmware versions, operating systems, networking technologies, development technologies and tools are constantly changing. The number of computer devices, moreover, is projected to rise at a compound rate of thirty eight percent a year; most of which will be networked and Web-enabled. Just as no brick and mortar business organization can operate without electricity, telephones, water or gas—no modern business can profit and grow without an IT infrastructure. Whether a "brick and mortar" business or an "click and order" electronic business, either the IT infrastructure of the business works and evolves or the business fails.

Most people expect the infrastructure to work and are not knowledgeable about managing an IT infrastructure. The irony, however, is that the dynamics of today's real-time, on-demand IT architectures also make it incredibly fragile. When the infrastructure slows down or fails, people and/or tools are required to quickly pinpoint the cause, suppress all symptomatic faults, prioritize multiple demands and assist with troubleshooting and repair to accelerate service restoration. Increasingly so, it is far too costly in terms of time and money to rely on humans to sift through an unending stream of symptomatic problems in order to anticipate or determine the cause of problems. For example, one service provider experienced a situation where they were receiving five hundred thousand problem notifications per day. No person or team of people can keep up with that many events. In the end, however, automated analysis actually reduced the number of daily problem notifications to two hundred actual alarm conditions and reduced the average time to find and fix a problem from over four hours to less than five minutes.

Almost every information technology infrastructure problem can be placed into one of three categories: (a) availability; (b) performance; or (c) threshold exceeded. Infrastructure faults occur when things break, whether they are related to networks, servers, storage, databases, applications or security. Black-outs or hard faults occur when one or more communication paths are degraded to the point that traffic can no longer pass; the cause could include broken copper/fiber cables/connections, improperly configured routers/switches, hardware failures, severe performance problems, security attacks, etc. Infrastructure performance problems often result in brown-out conditions where services are available but are performing poorly. From the user's perspective, however, a slow infrastructure is a broken infrastructure. The final category is abnormal behavior conditions where performance, utilization or capacity thresholds have not been met or have been exceeded as demand/load factors fall significantly above or below observed baselines.

Automated analysis of the causes of problems is but one aspect of autonomic computing. Autonomic computing refers to a branch of computer science wherein computing systems are able to configure, tune and repair themselves, as well as anticipate and solve performance problems automatically. The term autonomic computing is analogous to the autonomic central nervous system in the human body; both adjust to many situations automatically without any external help. Autonomic computer systems have hardware and software that respond to changes in the digital environment such that the systems adapt, heal and protect themselves. By enabling computers to take care of themselves, autonomic computing has many benefits for business systems, such as reduced operating costs, lower failure rates and more security. The ideal autonomic computing system is self-configuring meaning that it adapts to changes in the system; it is self-optimizing meaning it improves its own performance; it is self-healing by recovering from mistakes; and it is self-protecting meaning that it is able to anticipate and cure intrusions. By increasingly managing information technology tasks and systems, simplifying them, or removing them from human interaction, autonomic computing technology reduces the impact of this growing complexity and shifts the burden of managing IT systems from IT professionals to the systems themselves.

As mentioned, part of autonomic computing is self-optimizing and self-healing but simply being aware of a problem has never been acceptable. Predicting and preventing problems, pinpointing their causes, and prioritizing issues based on a problem's impact to the business and the technology are requirements for today's IT industry. The goal of problem determination, i.e., the detection and diagnosis of situations that affect the operational status or availability of business applications, is to maximize business and IT system availability by minimizing the time it takes to recover from situations that affect system availability.

A symptom is a form of knowledge that indicates a possible problem or situation in the managed IT environment. Basically, symptoms are indications of the existence of something else. Most of the time, symptoms are closely connected to the self-healing aspect of autonomic computing because their primary intent is to indicate a problem. Symptoms, however, can also be used as triggers for other kinds of problems related to the self-protecting, self-optimizing, and self-configuring aspects of autonomic computing. Autonomic computing requires that many aspects of the computer system exchange information so a symptom can be recognized and an occurrence can be created. An event correlation engine receives external stimuli, i.e., events, and checks if a symptom occurrence requires a response. When a new event occurs, it is forwarded to the correlation engine, which in turn processes all active symptom definitions and tries to match them against the new event being processed. The correlation engine also considers the probability or certainty associated with the problem or situation indicated by a symptom occurrence. By way of example only, any physical link or protocol failure could cause dozens of events from multiple devices. Without sophisticated correlation capability applied carefully, the network troubleshooters will spend most of their time chasing after symptoms, rather than fixing the real problem. Another common problem with some applications is the inability to manage memory usage. When the application no longer requires memory but does not return it for other applications to reuse, performance on the computer system or host machine will degrade and eventually the application may fail or the system may crash because it is out of memory. A sequence of events occurring within a predetermined period of time in which each event indicates a increased threshold of memory usage can give warning of memory leakage, and if appropriate action is taken, can preclude a system from crashing. Yet another example: events from security devices such as intrusion detection systems (IDSs) and firewalls can generate millions of log file entries. Autonomic symptom analysis may distinguish between sporadic client connection rejections and real security attacks. Fifty or more connection failures occurring in less than one minute may actually be a critical security breach.

A critical component of an event correlation system are the initial relationships, or rules defining a symptom. If these relationships between the events are incorrect or incomplete, any information received from them will be just as incorrect and incomplete. With the highly dynamic nature of networks today, however, maintaining a correlation among events is exceedingly difficult, if not impossible. Therefore, any automation that can extract potential relationships from properly formatted system logs is useful but many log entries are not detailed enough nor maintained in memory long enough to extract such information. In addition, the dynamism of the network may overwhelm the ability of a correlation scheme to keep up with changes.

In determining problems of computer systems involved in commerce, there are many different kinds of events that are generally targeted for different purposes. An event is typically defined as a phenomena or an occurrence in the IT system but other than that, the IT industry has yet to standardize definitions of event types. Some events are simply observed and do not adversely affect the system; other events cause problems such as hardware or software failures, security violations, and performance issues, etc. Events can be primitive such as a communication link being broken or a failed login attempt, or events can be considered a composite event of several primitive events related in time, such as multiple failed logins that might indicate a break-in attempt. Yet another functional description of events refers to problem determination events and business events. Problem determination events support the process of problem determination and requires data on operational status, state changes, request processing, performance metrics, faults, log events, and diagnostic trace events. Log events are collected during normal deployment and operations in production environments and are already used as the first indicators of problems occurring in a system wherein humans scan the logs looking for a problem or the system is keyed to warn an administrator if a certain event or string of events happens. Diagnostic or trace events are not typically reported nor available during normal production environments but, when available, are used by support teams and developers of components to capture internal diagnostic information about a component and trace problems if the log events do not contain sufficient data to do so. A business event is defined as something that happens that is of interest to the operation, monitoring, or management of the business. While the focus of a problem determination event is an IT resource, the focus of a business event is important to a business process such as retail stores, transportation paths, sales quotas, distribution nodes.

As mentioned, log events for software multithreaded or distributed applications are collected and stored in memory by log tools. Servers typically have comprehensive and flexible logging capabilities that generate and store a myriad of logs, e.g., security warning logs, error logs, access logs, multiple access logs, virtual host logs, other log files, etc. The error log records errors and diagnostic information experienced by a server. Included in most error log entries are the date and time of the message, the severity of the error being reported, the IP address of the client that generated the error, and the error message itself. The server access log is a record of all requests processed by the server and is usually quite large so that analyzing the server access log records to produce useful statistics requires considerable effort. Multiple access logs result from specifying multiple custom log directives in a log configuration file. Particular entries may be excluded from the access logs using environment variables. As another example, logging requests from english-speakers may be logged to one log file and requests from non-english speakers to a different log file. Conditional logging is also used to control the contents of the logs. Another way to control the information logged is through static logging levels but this approach does not provide semantic granularity; not all events at the same log level should be treated equally. For example, events that are involved in automated symptomatic analysis are much more valuable than events not identified as contributing to a failure. The current state of the logging art provides descriptions of simple usages of sliding windows and calculation of minimum and maximum values of data appropriate for simplistic data collections. All this to say that log files are most useful when they contain a complete record of server activity, and it is often easier to simply post-process the log files to remove requests that you do not want to consider.

Locating relevant information in large log outputs is difficult and the phenomena of trying to find a needle in a haystack of logs is called scrolling-blindness. Even for a moderately busy server the quantity of information stored in the log files is very large. The access log file typically grows one megabyte (MB) or more per ten thousand requests. As a result, it is necessary to periodically rotate log files by moving, and/or archiving and/or deleting the existing logs. Log rotation, however, may not be always be available while the server is running because the server continues to write to the log file as long as it holds the file open. So, the server must be restarted after the log files are moved or deleted so that it opens new log files. Other ways to perform log rotation without having to restart the server is to use piped logs by writing error and access log files through a pipe to another process, rather than directly to a file, or to use a log rotation available at an external site.

Logs are typically read by log analysis programs. For a web server, the logs have codes for the internet protocol (IP) address of the client making a request to the server, the userid of the person requesting the document as determined by authentication, the time that the server finished processing the request, etc. The request line from the client may have useful information such as the method and protocol used by the client and the resource requested by the client. The status code that the server sends back to the client reveals whether the request resulted in a successful response, a redirection, an error caused by the client, or an error in the server. Other servers and applications will log the same or other information. Autonomic computing may convert log files to a different format, the Common Base Event format, in order to perform diagnosis and propose solutions to the problematic situation.

Logging significantly impacts the performance of a computer system and its applications, especially during times of high input/output (I/O) operations. Nevertheless, many failures occur when a system is under stress so logging is a critical activity. There remains a need, however, for collection of complex multi-part data and for progressively collecting data using increased granularity of archived data and also to increase the amount of real-time data that is logged. These needs and other that will become apparent are solved by the invention as stated below:

SUMMARY OF THE INVENTION

These needs are solved and other advantages apparent to one of skill in the art are realized by a method of capturing real-time log data of an executing application comprising the steps of: retaining real-time log data of the executing application in a temporary memory; archiving the real-time log data at and below a first information level; receiving notice of a first event; changing the first information level to a second information level; and archiving the real-time log data at and below the second information level. The different information levels of the real-time log data may be indicative of critical performance behavior, the abnormality of which cause an IT dilemma; or indicative of a warning that a processing function is misbehaving; or indicative of a normal processing function. Certainly, changing an information level may involve changing more than one information level.

The invention may further be considered an autonomic data processing system, comprising: a logging application to obtain real-time log data of a plurality of operating parameters of an executing application; a temporary memory in which to retain the real-time log data; an archival memory in which to store selected real-time log data; an information level module that determines which selected real-time log data is archived in the archival memory; and an event indicator triggered by an event occurring during the execution of the application, wherein in response to the event, the information level module immediately changes the selected real-time log data archived in the archival memory. The logging application, the temporary memory, the application being logged, the archival memory, and the information level module may all be on the same or different servers connected on a network.

It is further within the purview of the invention that the autonomic data processing comprise a learning module whereby the selected real-time log data archived in the archival memory is compared with the event to learn whether the event precedes any problem occurring in the autonomic data processing system. In any event, the autonomic data processing system further comprises a remedial module that takes corrective action to prevent the problem indicated by the event, including the capability to remove a component causing or reacting to the problem indicated by the event.

The invention may also be considered a computer program product in a computer-readable medium comprising a computer usable medium having computer usable program code, wherein the computer usable program code, when loaded into the internal memory of a processing device, causes the processing device to: log an executing application in real time; retain real-time log data from logging the executing application in a temporary memory; archive a portion of the real-time log data at a first information level; notice the occurrence of an event; and archive a portion of the real-time log data at a second information level in response to the event. The computer usable program code may further cause the processing device to: review the portion of the real-time log data archived at any or all the information levels; review the time and nature of the event; determine what, if any, real-time log data archived at what information level relates to the event; and store knowledge gained from the determination.

DETAILED DESCRIPTION OF THE INVENTION

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, and a computer program product that dynamically adjusts the information level of log data archived and the time window that the log data are retained in a temporary memory in response to either a single event or a sequence of events constituting a symptom of IT dysfunction. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code for dynamically adjusting the information level of log data archives and the time window that the log data are retained in a temporary memory in accordance with a preferred mode described herein may be written in a computer programming language such as C, COBOL, FORTRAN, LISP, JAVA, SMALLTALK or C++. Object code to dynamically adjust the information level of log data archived and the time window that the log data are retained in a temporary memory may execute entirely the computer or system being logged or partly on a logging or monitoring server. When the program source code is located and executing on the a server whose operations are being logged, it may be connected to the other servers through any network, such as a local area network (LAN) or a wide area network (WAN), or the connection may be made via the Internet using an Internet Service Provider. In one embodiment, the dynamic adjustment of the information level of log data archived and the time window that the log data are retained in a temporary memory as described herein may be implemented in a Common Event Infrastructure (CEI) server that supports reporting, persistence, distribution, and interpretation of event data, or a JAVA™ 2 Platform, Enterprise Edition (J2EE) application running in WEBSPHERE® Application Server.

The dynamic adjustment of the information level of log data archived and the time window that the log data are retained in a temporary memory is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions for dynamically adjusting the information level of log data archived and the time window that the log data are retained in a temporary memory may also be stored in a computer-readable memory that can direct a computer or other programmable data processing apparatus to function in a particular manner, such that the instructions stored in the computer-readable memory produce an article of manufacture including instructions which implement the functions/acts specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
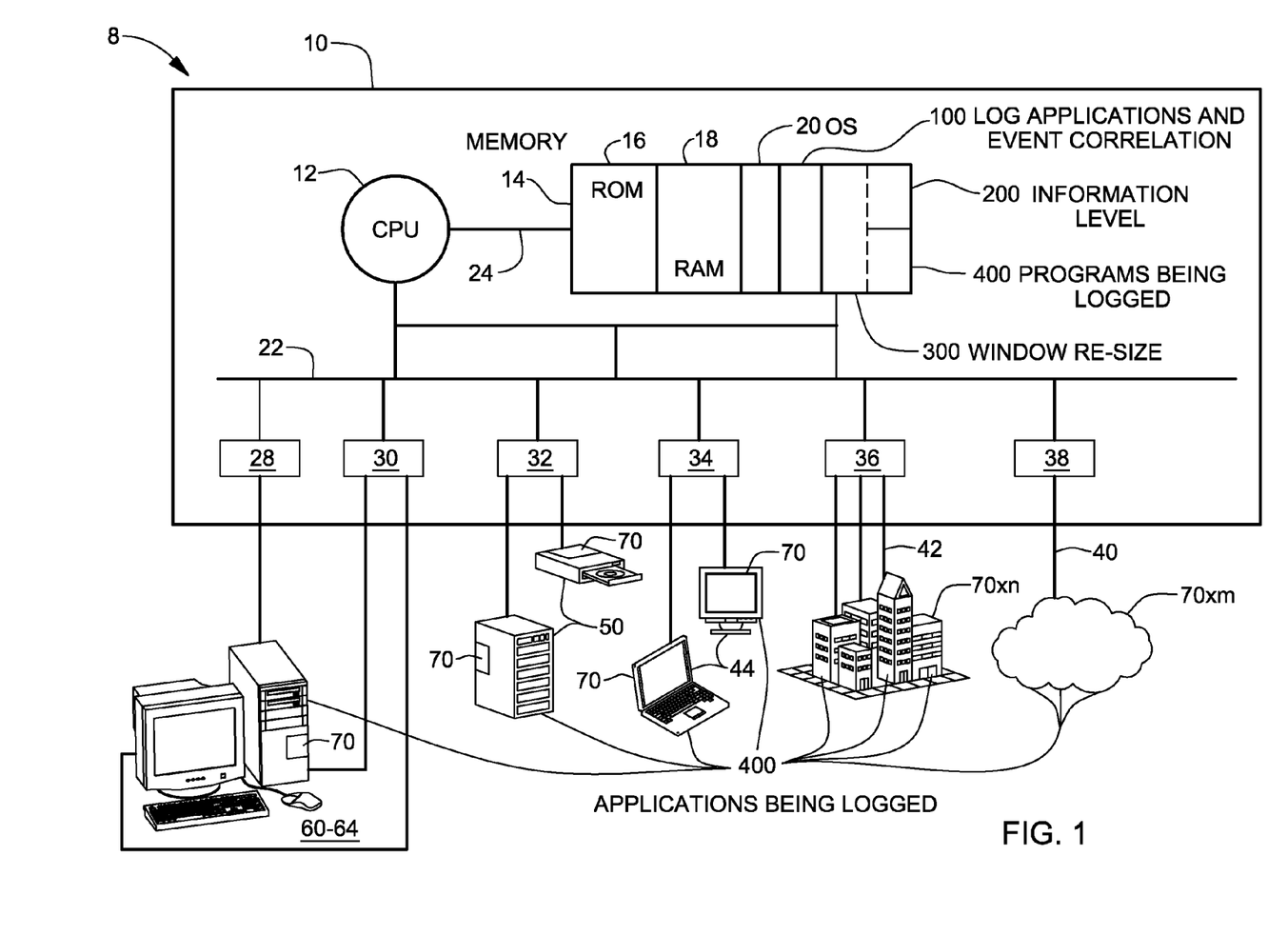
FIG. 1 is a simplified block diagram of a data processing network and machine capable of implementing the sliding window of archiving log data in accordance with an embodiment of the invention.

Referring to FIG. 1, a high-level block diagram of a computer network system 8 consistent with an embodiment of the invention as an autonomic data processing system and its infrastructure are shown. Computer network system 8 preferably comprises a number of secure networked computers 10, each of which may have a central processing unit (CPU) 12, memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 1, it should be understood that computer systems or servers having multiple CPUs could be used. CPU 12 is capable of executing an operating system 20 and the application program code 200 that dynamically adjusts the information level of log data archived, application program code 300 that dynamically adjusts the time window that the log data are retained in temporary memory and other applications 100. CPU 12 is also capable of generating the computer program or the instructions embodying the dynamic adjustment of the information level of log data archived 200 and the time window that the log data are retained in a temporary memory 300, is capable of receiving and transmitting the program instructions embodying the dynamic adjustment of the information level of log data archived 200 and the time window that the log data are retained in temporary memory 300, and is capable of storing the log data generated by the logging applications and a event correlation engine 100. Communications bus 22 supports transfer of data, commands and other information between different devices, and while shown in simplified form as a single bus, it is typically structured as multiple buses including an internal bus 24 which may connect the CPU 12 directly with memory 14.

Memory 14 comprises a read only memory (ROM) 16 and a random-access memory (RAM) 18 for storing the operating system 20, the program instructions for the dynamic adjustment of the information level of log data archived 200 and program instructions for the dynamic adjustment of the time window that the log data are retained in a temporary memory 300, the logging programs and the correlation engine 100, and other data and programs. Typically, those portions or programs, routines, modules of the operating system 20 necessary to "boot up" are stored in ROM 16. RAM 18 typically stores programs and data that will be erased when the computer turns off. Memory 14 is shown conceptually as a single monolithic entity but it is well known that memory is often arranged in a hierarchy of caches and other memory devices, some or all of which may be integrated into the same semiconductor substrate as the CPU 12. RAM 18 devices comprises the main storage of computer, as well as any supplemental levels of memory, e.g., cache memories, nonvolatile or backup memories, programmable or flash memories, other read-only memories, etc. and in an embodiment of the invention, RAM 18 provides the temporary memory for log data. In addition, memory 14 may be considered to include memory storage physically located elsewhere in computer, e.g., a cache memory in a processor or other storage capacity used as a virtual memory, e.g., as stored on a mass storage device 50 or on another computer coupled to computer via network. In the context herein, a memory location may also be a nonvolatile or backup memories or a programmable or flash memories, read-only memories, etc., in a device physically located on a different computer, client, server, or other hardware memory device, such as a mass storage device or on another computer coupled to computer via network. It is intended that temporary memory 70 be available wherever an application is being logged. Memory location also comprises remote archival memory such as one or more rotating magnetic hard disk drive units, a tape or optical driver. Memory location may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others.

Operating system 20 and the program instructions to dynamically adjust the information level of log data archived 200 and the time window that the log data are retained in a temporary memory 300 and other applications 100 reside in memory 14. Operating system 20 provides, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems 20 and other various routines to dynamically adjust the information level of log data archived 200 and the time window that the log data are retained in a temporary memory 300, and other applications, components, programs, objects, modules, etc. may also execute on one or more processors in another computer coupled to computer 10 via a network 40, 42, e.g., in a distributed or client-server computing environment, whereby the processing required to implement the functions of a computer program may be allocated to multiple computers, also called servers, 10 over a network 40, 42.

In general, the dynamic adjustment of the information level of log data archived 200 and the time window that the log data are retained in a temporary memory 300 executes within the CPU 12 to implement the embodiments of the invention, whether implemented as part of an operating system or a specific application, component, program, object, module or sequence of instructions may be referred to herein as computer programs or simply programs. The dynamic adjustment of the information level of log data archived 200 and the time window that the log data are retained in a temporary memory 300 typically comprise one or more instructions that are resident at various times in various memory and storage in a device and that, when read and executed by one or more processors in the processing device 10, cause that device 10 to perform the steps necessary to execute steps or elements embodying the various aspects of the invention. The dynamic adjustment of the information level of log data archived 200 comprises a module or routine that, in response to occurring events, changes the information level of log data archived; this module or routine is called the information level module 200. A second module 300 detects events and then correlates the sequence of events with a symptom to increase the allocation of temporary memory available in order to store logging data for a longer period of time; this module 300 is called the window-sizing module 300. The window-sizing module 300 may be included as part of an event correlation engine 100. The application that is actually being logged in represented as 400 and could be executing on an server or processing device connected to processing device 10 across a network 40, 42 or across an internal or external bus 22, 24. It is also intended that in such an autonomic data processing system having the modules 200 and 300, the logging applications and event correlation engines 100, and the logged applications 400 generating the real-time log data stored in temporary memory 70 be connected through the any network, and that the network be considered a broadband bus.

It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct software developer input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital video disk (DVD) drive, etc., and/or a tape drive, among others. Data 52 created by or transmitted by the logging applications 100 may be archived on these mass storage devices of different computers 10 that are located through the internet 40, a WAN 42, and other connected machines 42. One of skill in the art further understands that the interfaces 28-38 may also be wireless.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Still yet, any of the components of the method and program products shown in the embodiments of FIG. 2 through FIG. 8 could be deployed, managed, serviced by a service provider who offers to perform one or more of: the logging applications and the event correlation engine 100, the information level module 200, the window sizing 300 or other process steps that dynamically adjust the information level of log data archived and the time window that the log data are retained in a temporary memory.

Figure 2:
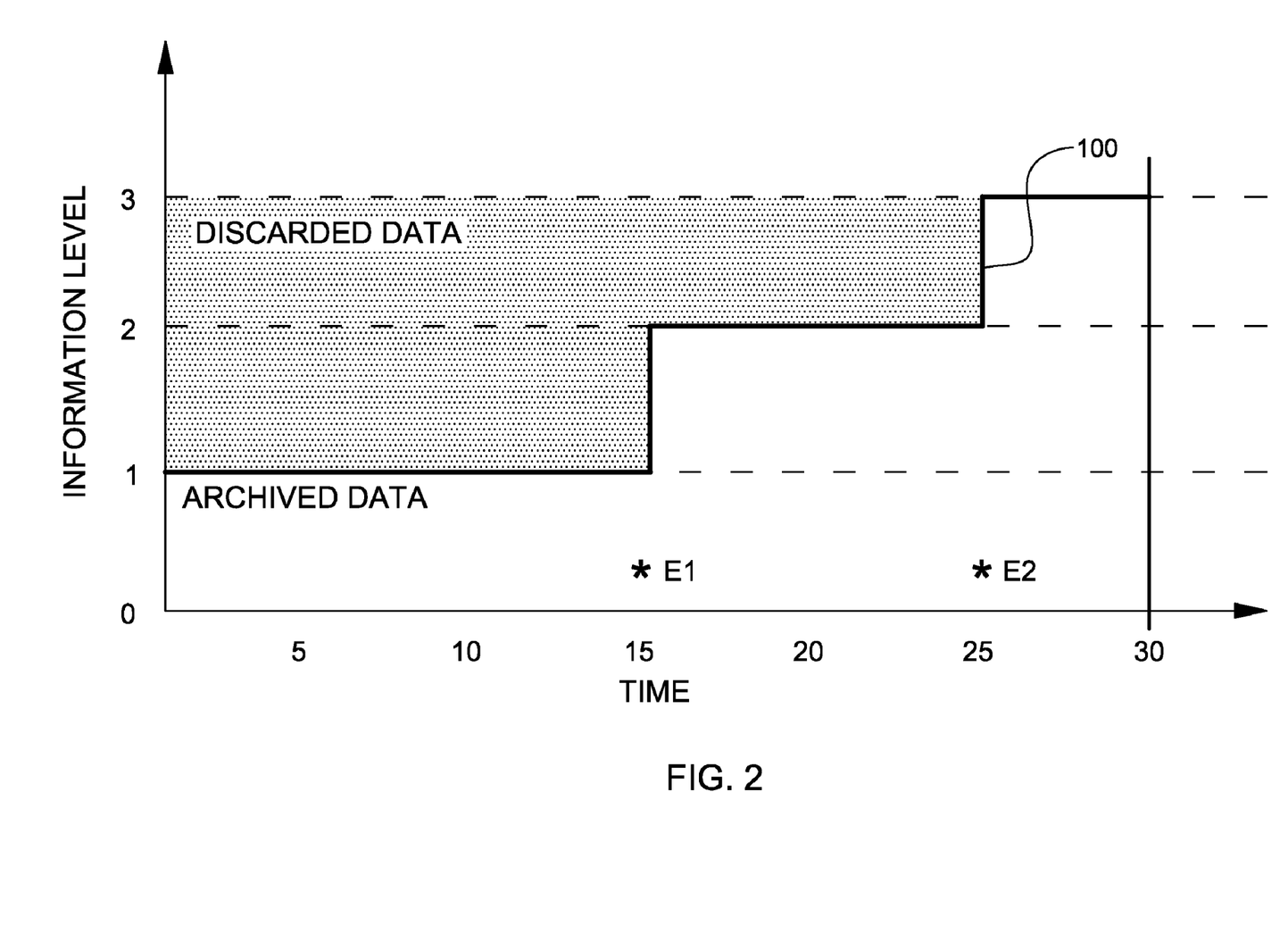
FIG. 2 is a graph of logging levels captured in response to an event without the benefit of the invention.

Directing the reader's attention to FIG. 2, a chart is shown of the logging information derived from a logging program not having the benefit of the invention described herein. Time is represented in arbitrary units and may be days, hours, minutes, seconds, microseconds, etc. along the x-axis and the level of information or granularity is represented along the y-axis. The heavy line 100 represents the archiving level, i.e., the granularity of the information that is archived. By way of example, from time 0 to time 15, log data of operating characteristics above level 1 are discarded before the log data is archived. As can be seen, at time 15 event E1 occurs. At time 25, a second event E2 occurs. At time 30, the system crashes. In the prior art, all critical log data at information level 2 and higher about the cause of the crash before time 15 is lost.

Figure 3A:
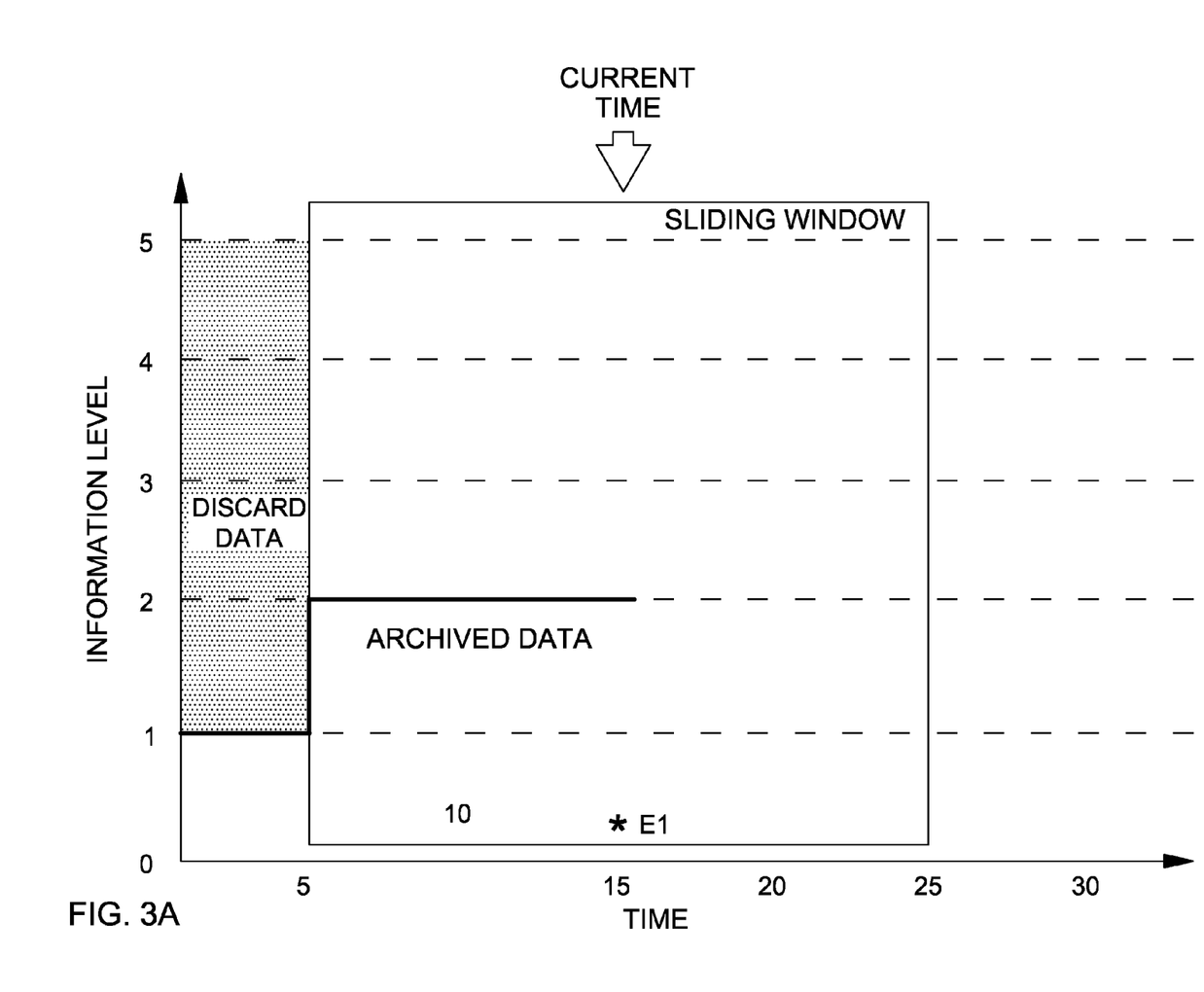
FIGS. 3A and 3B are graphs of a sliding window showing a change in the time and the amount that logging data is retained in response to an event in accordance with an embodiment of the invention.
Figure 3B:
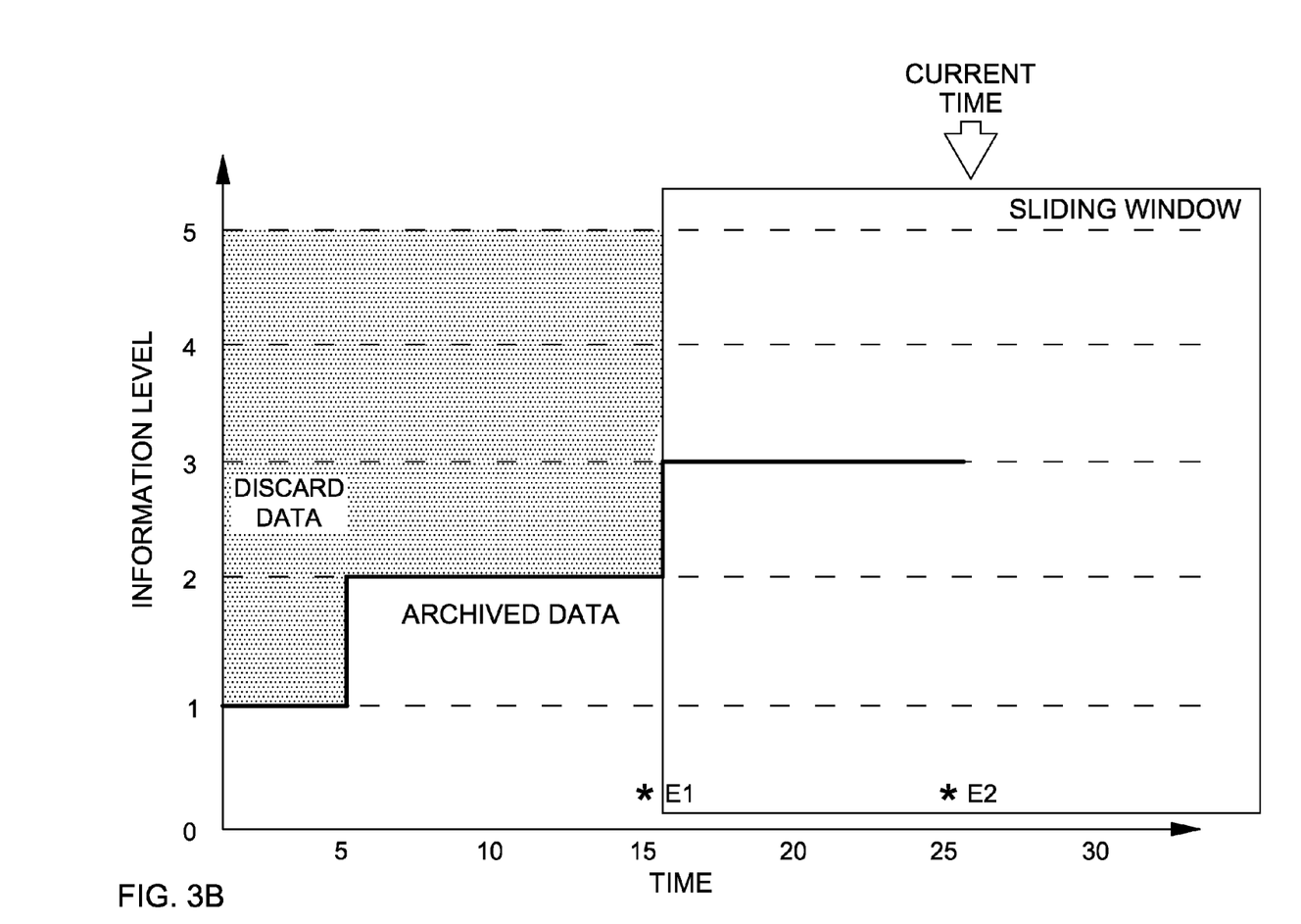

Now consider FIGS. 3A and 3B which illustrate the results of an embodiment of dynamically adjusting the information level of log data archived 200. In FIG. 3A logging occurs as normal and all log data is retained in temporary storage. By way of example, level 1 logging information is indicative of an event that has dramatic impact on the system, for instance, a level 1 event might cause the system to crash if not immediately corrected. Level 2 information may indicate a warning message, e.g., memory is rapidly becoming unavailable, disk space is reaching a maximum, too many network failures are occurring, response times are significantly slower, etc. Level 3 information may be informational and may indicate the time and number of transactions, cache misses, etc. Types of information to be logged include memory space available, memory accesses, failure rate, disk space available, the number of transactions, network performance, the number of free memory buffers, etc. There are a myriad of logging programs or applications that can be modified to dynamically adjust the levels of events logged and the time those logs are retained in accordance with the invention. Many components provide events and events come in many forms: Simple Network Management Protocol (SNMP) traps, syslog messages, application log file entries, Transaction Language 1 (TL1) events, ASCII streams, etc. Sophisticated autonomic systems also generate events based on proactive polling of component status, parameter-based threshold violations, response time measurement threshold violations, etc. One of skill in the art will realize that the types of events corresponding to particular information levels will vary according to the applications, the servers, the demands on the system, etc. and ideally are programmable parameters for dynamically adjusting the information level of log data archived 200 and the time window that the log data are retained in a temporary memory 300.

Returning now to a discussion of FIG. 3A, logging occurs as normal and all log data is retained in temporary memory. As temporary memory fills up, all or some of the log data may be discarded and some log data may be archived into a more permanent memory. Event E1 occurs at the current time 15. In accordance with a feature of the invention, immediately the information level of data that is archived increases to a higher level, e.g., level 2. But because all the log data is retained in temporary memory, the invention works to increase the amount of data that is transferred from temporary memory to archive memory. That is, immediately upon the occurrence of event E1, both level 1 and level 2 log data are transferred to archive memory—only level 3 data is discarded in the example provided.

Figure 4:
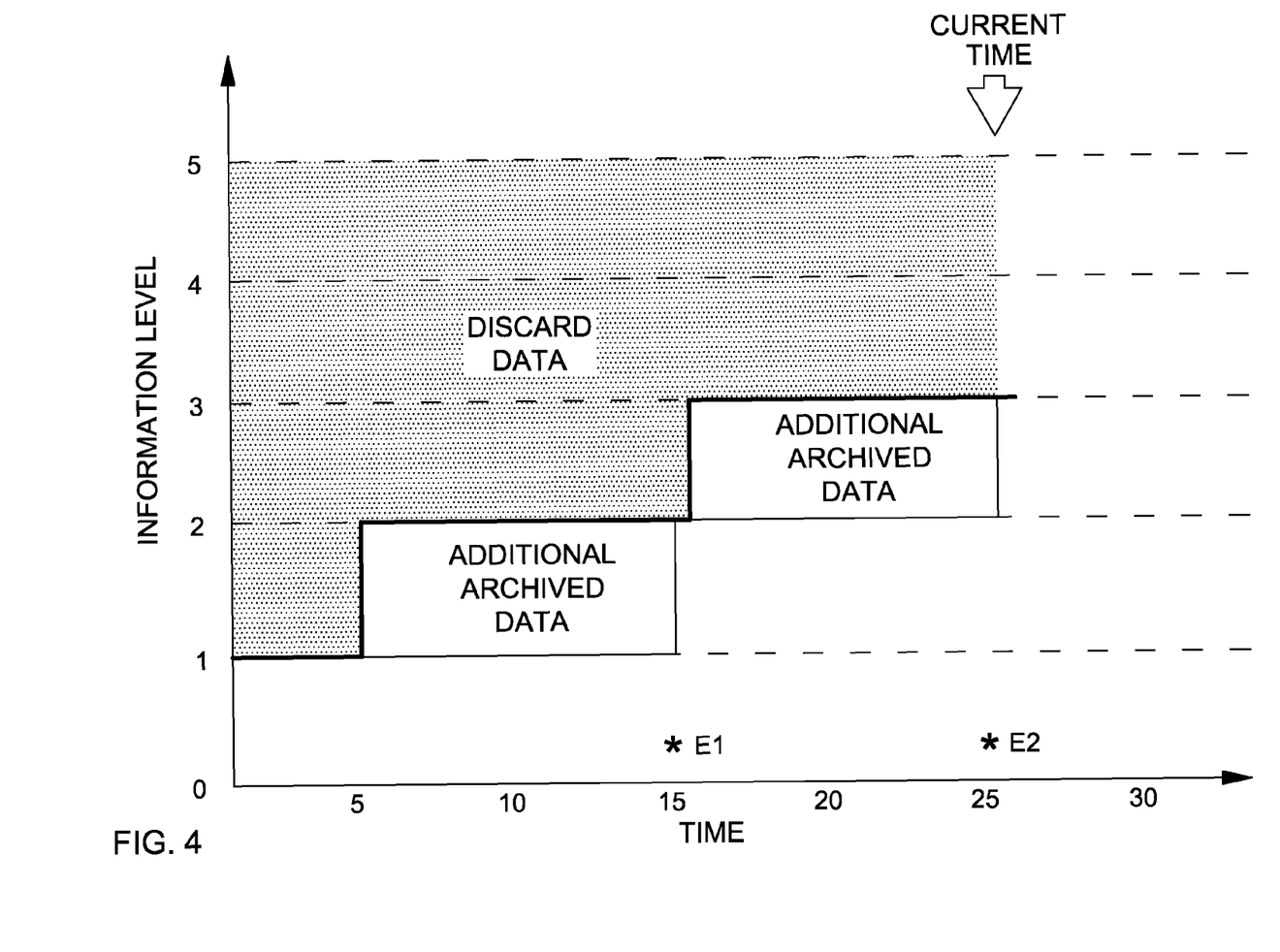
FIG. 4 is a graph of a sliding window illustrating the additional data logged in accordance with an embodiment of the invention. It is suggested that FIG. 4 be printed on the face of the patent.

Consider FIG. 3B and at current time 25 the second event E2 occurs. In accordance with features of the invention, the level of information transferred to archive memory immediately increases to a higher level, e.g., level 3, and previous log data for lower levels, e.g., level 2 and level 1, are archived for a previous time period from time 15 to time 25. FIG. 4 is a graphical representation of the additional data that now becomes available for analysis as a result of dynamically adjusting the information levels of log data archived 200 in accordance with features of the invention. Level 2 log data between time 5 and time 15 and level 3 log data between time 15 and time 25, all of which would ordinarily be discarded, are now archived.

Figure 5:
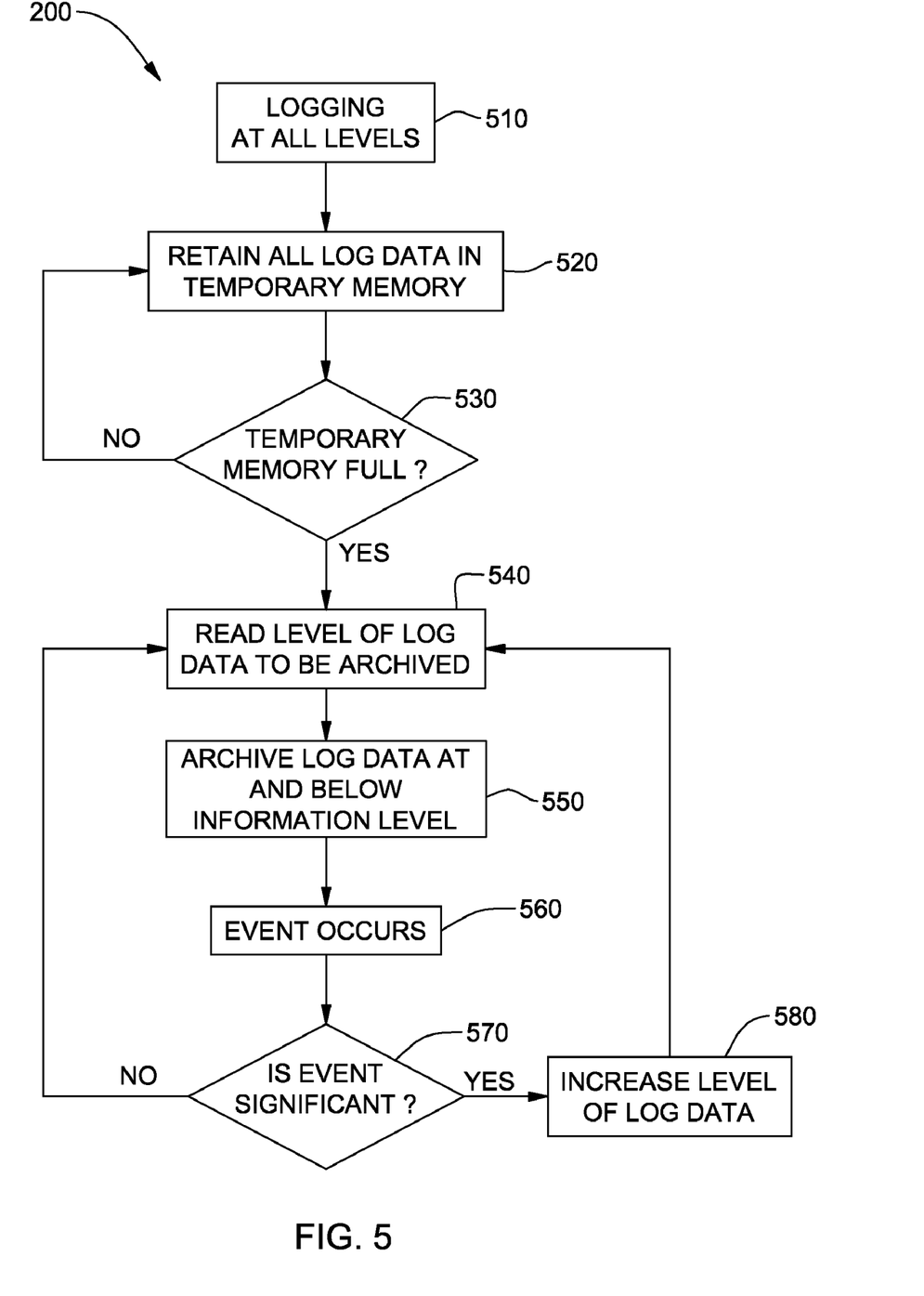
FIG. 5 is a simplified flow chart of the steps of the processes of FIGS. 3A and 3B.

FIG. 5 presents the process steps by which the dynamic logging module 200 changes the level and the amount of archived log data for analysis increases. Simply, by dynamically changing the level of log data that is archived, the amount of data increases. In step 510, logging occurs as normal, such as with the TIVOLI® Monitoring or other commercial logging program. In step 520, log data at all levels is retained in a temporary memory, such as a RAM memory, a temporary buffer, until the memory or buffer is full, as in step 530. At step 540, the information level module 200 reads the current level of information that is of interest and the log data at that current level of information and below are archived at step 550 to a more permanent memory, such as a hard disk drive or to a storage access network, etc. Archiving may be done in a streaming FIFO (first in first out) arrangement meaning that as new data comes into temporary memory, the older data is archived. In fact, this is the preferred arrangement because, depending upon the amount of the temporary memory allocated to the logging application 100 as will be discussed, the past history of log data retained in the temporary memory is archived. Alternatively, there may be a timed delay, such as ten or more seconds, minutes, and the temporary memory could be cleared at once, with the log data at the current level of interest being archived and log data above the current level of interest being discarded.

At step 560, an event occurs and is reported to the information level module 200. The information level module 200 then ascertains at step 570 whether this event is significant, i.e., does the event indicate that more log information should be saved or archived. This step may be carried out in conjunction with an event correlation engine. Information level module 200 or the event correlation engine (not shown) may determine that a problem exists simply by evaluating the nature of the event against a known list of events, or preferably from a self-learning module wherein historical knowledge exists that certain events precede certain problems. Indeed, the inventors contemplated that the information level module 200 and the steps of FIG. 5 may be implemented in the self-learning aspects of autonomic computing wherein the historical log data are retained in temporary memory, archived and then compared with events that occurred after the time of the log data.

If the event is not significant, the information level of the log data does not change in step 540. In response to a significant event, however, the information module 200 increases the level of information of log data to be archived at step 580. Of course, depending upon the event, the level of information may increase slightly or more such that all log data immediately becomes of interest and is archived. This increase in the information level of log data is fed back to step 540 which filters the log data and archives the current information level and discards the remaining. Certainly, if all the log data is archived, then none is discarded.

Figure 6A:
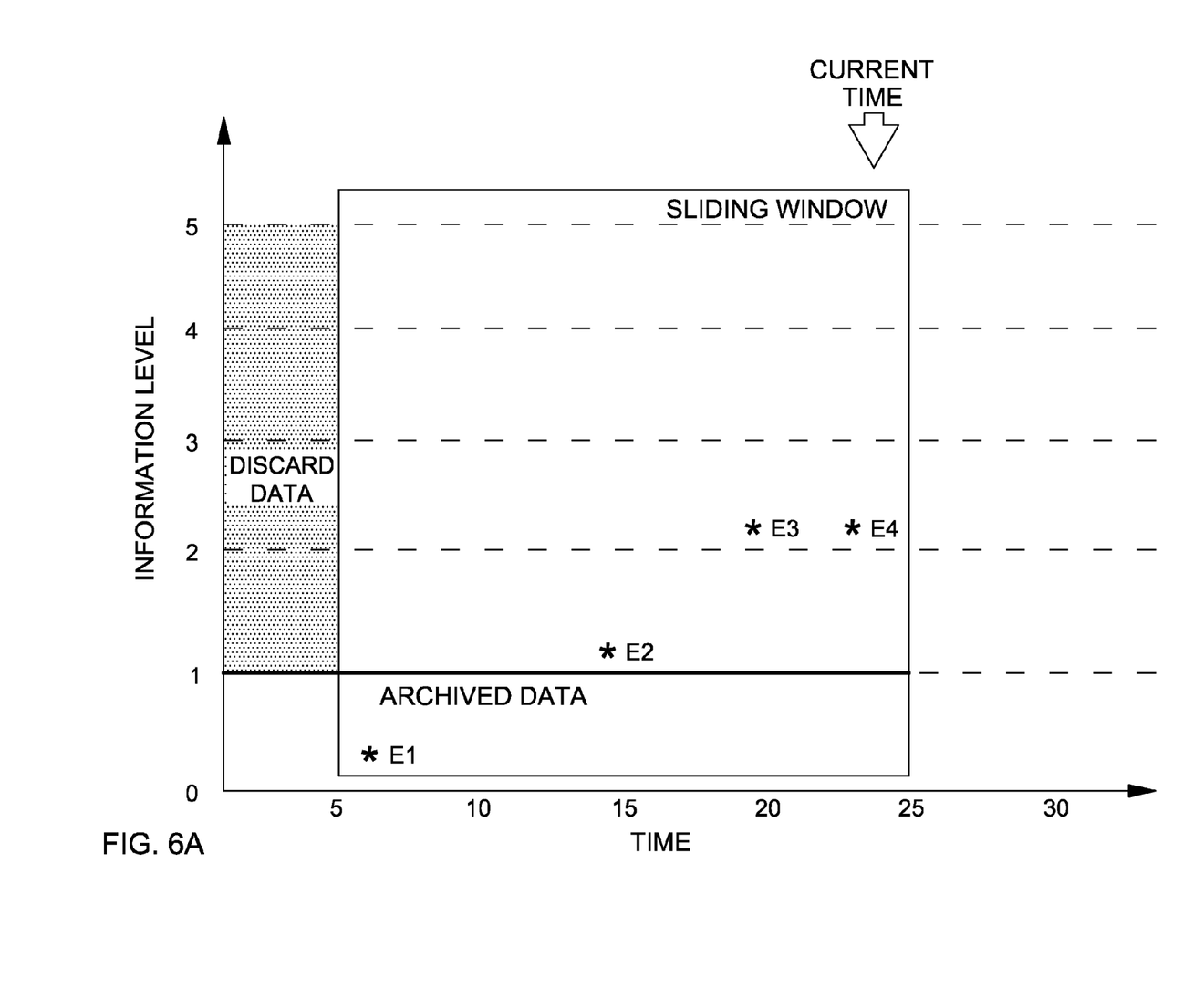
FIGS. 6A and 6B are graphs of logging levels containing a plurality of events.
Figure 6B:
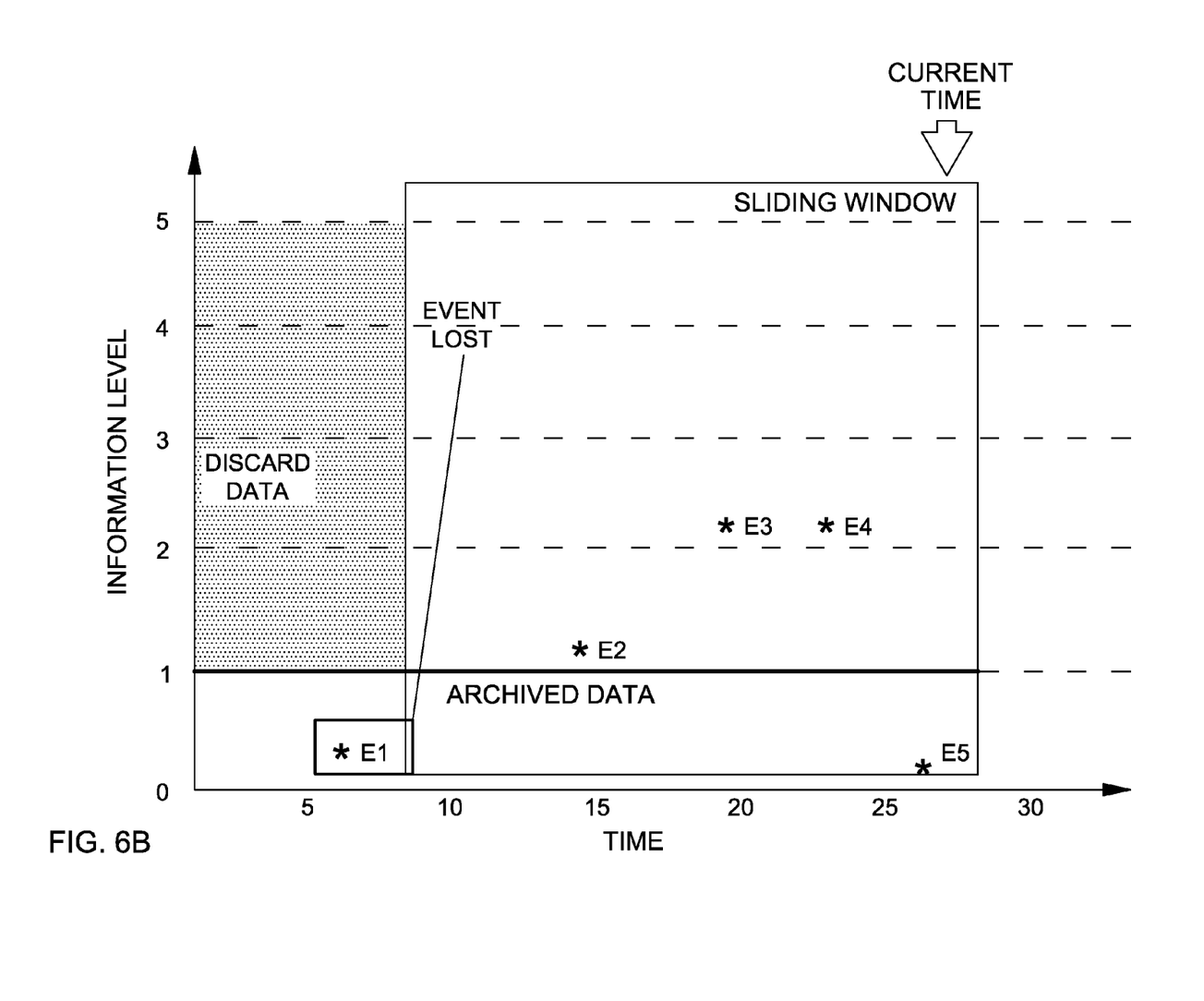

Events that are involved in automated symptomatic analysis are much more valuable than events that have not been identified as contributing to a failure. The method and system of dynamically adjusting the information levels of log data archived preferably is combinable with autonomic symptom analysis in accordance with features described herein. With reference to FIG. 6a, four sequential events E1, E2, E3, and E4 are shown. When using a sliding window of event logging wherein all the log data within the time period represented by the window is retained in temporary memory, care must be taken to prevent important events in multipart symptoms from falling off the end of the window or being discarded before the symptom has been recognized. In accordance with features of the invention, when an event arrives that is involved in a symptom match, that event preferably anchors the tail end of the sliding window and in response, the window of time resizes to allow for retention of additional new events that may yet occur. When a symptom finally completes its match or aborts, the window size can be reevaluated back to its original width if no other symptoms need the event for their partial matches. For instance, consider FIG. 6b, the sliding window has advanced to include event E5. Event E5, however, is part of a sequence of events resulting in recognition of a symptom beginning with event E1. But because of the sliding window advancement, event E1 was discarded before it could be archived. As a result, no symptom will be identified. Note also that the information level of log data remains the same and subsequent events above level 1 information are also discarded.

Figure 7:
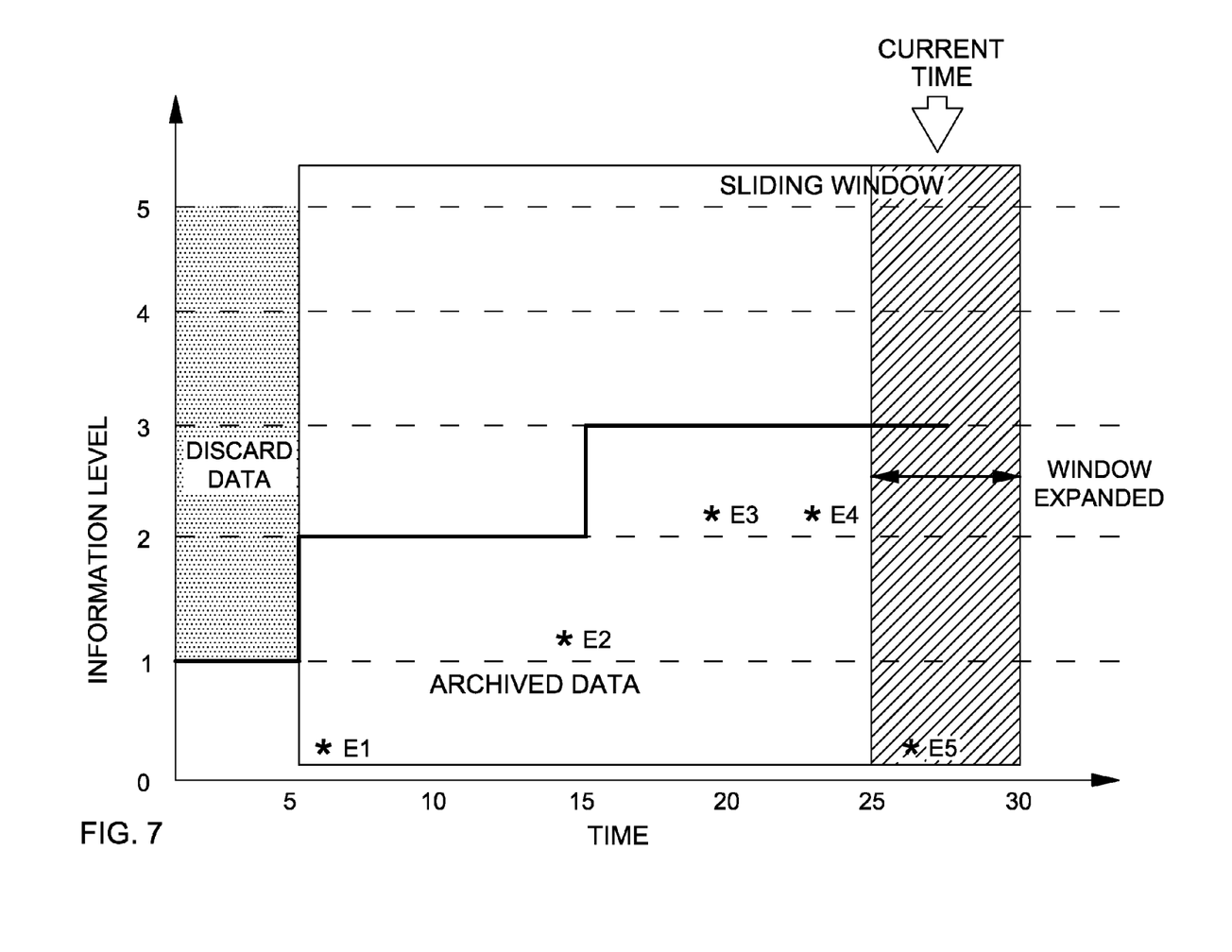
FIG. 7 is a graph of a sliding window illustrating the adjustment of the amount and level of additional data retained in temporary memory in response to autonomic recognition of a number of events occurring that may constitute a symptom.

FIG. 7 provides a graphical illustration of a dynamic parameters sliding window that has extended its width while advancing to include event E5. An event correlation or analysis engine, immediately upon noting that events E1 through E4 occurred, may provide feedback to the window resize module 300 to not only obtain a higher information level of log data but also to increase the size of the window in anticipation of event E5. In other words, the sliding window automatically extends its width because of partial recognition of a symptom and the likelihood of a future event occurring within a specified time corresponding to the extended length of the window. Because the size of the window was dynamically extended, data corresponding to event E1 is retained in temporary memory and the symptom is recognized. As a further result of symptom recognition, the information level of the log data is increased in a step-wise progression by the information level module 200.

Figure 8:
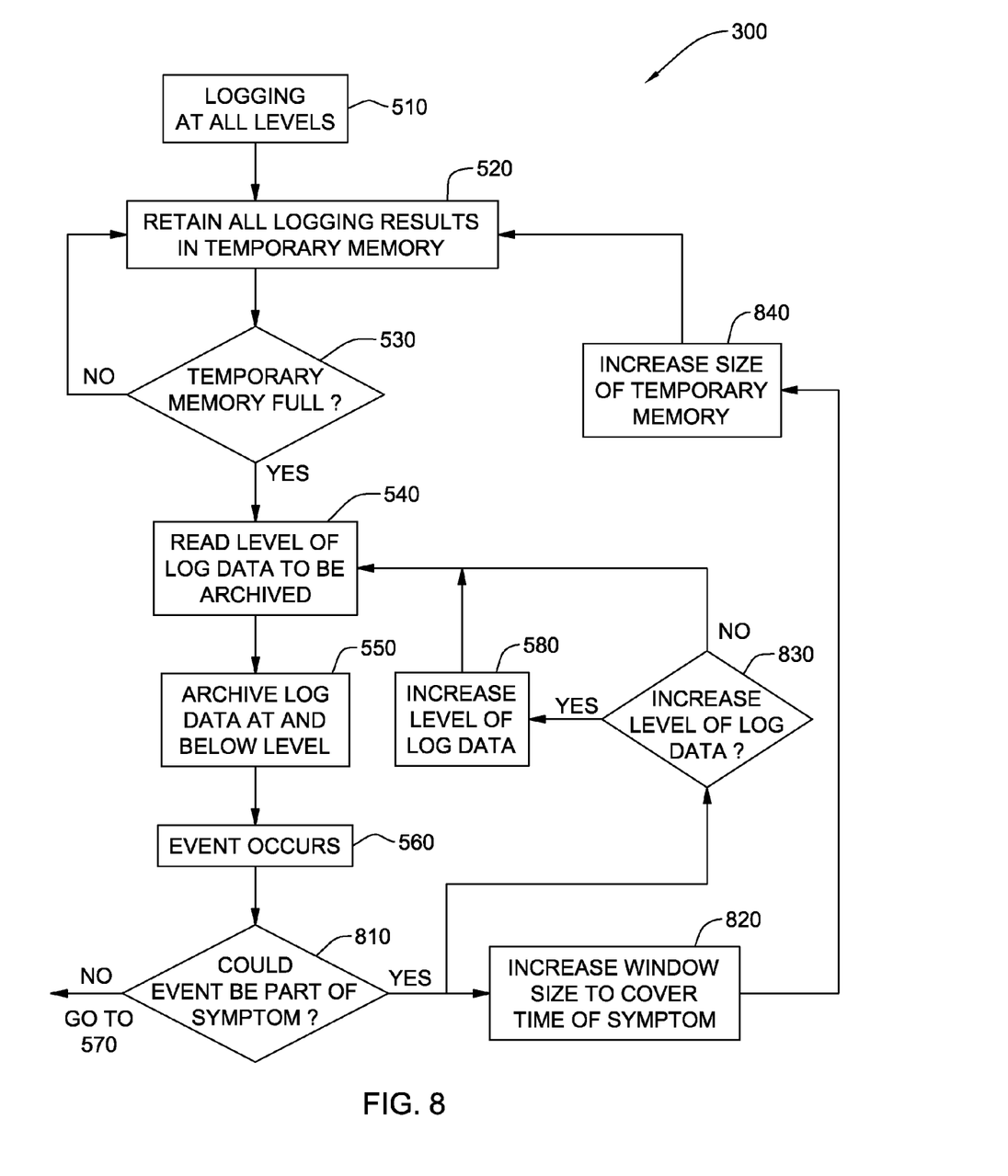
FIG. 8 is a simplified flow chart of the steps of the processes of FIG. 7.

FIG. 8 shows that process steps of the resizing module 300 that, in response to possible symptom recognition, enlarges the time window that historical data is retained in temporary memory. In step 510, logging occurs using a commercial log program such as TIVOLI® Monitoring program. All log data is stored in temporary memory, such as RAM, as in step 520. When the temporary memory is full, as in step 530, the information level of log data to be archived is determined at step 540 and log data at that level of information and below are archived in step 550. At step 560, an event is reported to the window resizing module 300. The window resizing module 300 then considers, preferably in conjunction with an event correlation engine, its historical data and makes a determination if the event may be part of symptom at step 810. If not, then the resizing module 300 defers to step 570 of the information level module 200 for determination if the event is significant in and of itself.

If the event is determined to part of a symptom, the resizing module 300 then increases the window size at step 820. One way to increase the window size, i.e., increase the amount of time and the amount of data that is stored in temporary memory, is to enlarge the temporary memory as in step 840. Quite simply, the logging application implementing the resizing module 300 requests allocation of more temporary memory, e.g., increase its RAM or the size of the temporary buffer. Note that already there is historical log data in the temporary memory; increasing the size of the temporary memory simply means that more data from the past accumulates before archival.

Upon the recognition that the event could be part of a symptom at step 810, the resizing module 300 can then perform some of the same actions as the information level module 200 by determining if possible symptom analysis could benefit from increasing the information level of log data as in steps 830. If so, the information level of log data to be archived is increased as in step 580. Otherwise, the information level of archived data remains the same.

Thus, event data that falls off the sliding window is archived or otherwise kept active and not lost. In one embodiment, whenever an event falls off the window, the window resizing module 300 or an event correlation engine may analyze whether this data will ever be useful within the scope of the current knowledge the system. If the data is not useful within the current scope of all potential consumers, it is either discarded or for a system currently in staging/training, the data will be archived elsewhere closer to the actual consumer. Thus, a self-learning window resizing module 300 in an autonomic computer system, whether it is part of an event correlation engine or not, would surmise that a problematic symptom in occurring based upon historical information analysis and upon detection of a sequence of events. The window resizing module 300 may also increase the information level of log data to further analyze this symptom going forward which causes the higher level information log data for this past time preceding the event to be archived.

Sometimes it is preferred to archive all events so that the information level module 200, the window resizing module 300, the log applications and an event correlation engine 100 can perform post mortem analysis and update symptom databases with newly discovered event patterns mined from the archives. There is a tradeoff, however, between this activity and production system performance. Preferably, a policy or performance analysis by a performance manager triggers selective archival vs. complete archival. For example, during peak hours of activity when the performance managers realizes that the logging and archiving activity adversely affects performance and every bit of performance is crucial to satisfy operational service demand, the information level module will be switched to selective archival at a lower information level so that known problems are automatically self-managed.

In a preferred embodiment, the dynamic adjustment of the information level of log data archived 200 and the time window that the log data are retained in a temporary memory 300 are implemented in IBM's TIVOLI® Monitoring and TIVOLI® Enterprise Console. In any event and in any monitoring and analysis system incorporating the dynamic adjustment of the information level of log data archived 200 and the time window that the log data are retained in a temporary memory 300, events received by autonomic managers are able to perform more exact event correlation functions by processing symptom definitions. If a symptom occurrence exists, an autonomic manager may react by executing symptom effects associated with them.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method of capturing real-time log data of an application executing in a computer comprising the steps of:
  retaining a first real-time log data of the executing application in a temporary memory;
  archiving the first real-time log data at a first information level;
  the first real-time data comprising a first event;
  in response to the first event, changing the first information level to a second information level;
  increasing a time history of and archiving a second real-time log data at the second information level in addition to archiving the first real-time log data.

2. The method of claim 1, wherein the first real-time log data at the first information level is indicative of critical performance behavior, the abnormality of which indicates an IT dilemma.

3. The method of claim 2, wherein the second real-time log data at the second information level is indicative of a warning that a processing function is misbehaving.

4. The method of claim 3, wherein a third real-time log data at a third information level is indicative of a normal processing function.

5. The method of claim 1, further comprising the steps of:
in response to the first event, archiving the first event as first real-time log data;
in response to the first event, increasing the time duration of retaining the first real-time log data and the second real-time log data;
archiving the first real-time log data and the second real-time log data.

6. The method of claim 5, further comprising the steps of:
analyzing the archived first real-time log data and archived second-real-time log data to determine that subsequent events occurred during execution of the application;
learning that the first event and one or more of the subsequent events comprise a symptom of impaired computer processing functionality;
taking remedial action when the first event and the one or more of the subsequent events occur during computer processing to prevent impaired computer processing functionality.

7. An autonomic data processing system, comprising:
a logging application to obtain a real-time log data of a plurality of operating parameters of an executing application;
a temporary memory in which to retain the real-time log data;
an archival memory in which to store selected a real-time log data;
an information level module that determines which selected real-time log data is archived in the archival memory;
an event indicator triggered by an event occurring during the execution of the application;
wherein in response to the event, the information level module immediately increases the information level and the time period of the selected real-time log data archived in the archival memory.

8. The autonomic data processing system of claim 7, wherein the logging application is executing on a first server.

9. The autonomic data processing system of claim 8, wherein the logging application is executing on a second server.

10. The autonomic data processing system of claim 8, wherein the archival memory is located on a remote memory separate from the second server.

11. The autonomic data processing system of claim 7, wherein the information level module is located on a third server.

12. The autonomic data processing system of claim 9, wherein the first server and the second server and the archival memory are connected on a network.

13. The autonomic data processing system of claim 7, further comprising a learning module whereby the selected real-time log data archived in the archival memory is compared with the event to learn whether the event precedes any problem occurring in the autonomic data processing system.

14. The autonomic data processing system of claim 13, whereby the learning module compares the selected real-time log data archived in the archival memory with a plurality of events to determine if one or more of the plurality of events comprises a symptom of a problem occurring in the autonomic data processing system.

15. The autonomic data processing system of claim 13, further comprising a remedial module that takes corrective action to prevent the problem indicated by the event.

16. The autonomic data processing system of claim 15, whereby a remedial module removes a component from the autonomic data processing, the component causing or reacting to the problem indicated by the event.

17. A computer program product in a computer-readable medium comprising a computer storage medium having computer usable program code, wherein the computer usable program code, when loaded into the internal memory of a processing device, causes the processing device to:
log an executing application in real time;
retain real-time log data from logging the executing application in a temporary memory;
archive a portion of the real-time log data at a first information level;
the real-time data logging an event;
in response to the event, increase a time history of and information level of the real-time log data to a second information level which is greater than and includes the real-time log data at the first information level;
archive the real-time log data at the second information level in response to the event.

18. The computer program product of claim 17 in a computer-readable medium comprising a computer storage medium having computer usable program code, wherein the computer usable program code, when loaded into the internal memory of a processing device, causes the processing device to:
review the portion of the real-time log data prior to and after the event archived at the first information level;
review the time and nature of the event;
determine that the reviewed real-time log data archived at the first information level relates to the event; and
store knowledge gained from the determination.

19. The computer program product of claim 18 in a computer-readable medium comprising a computer storage medium having computer usable program code, wherein the computer usable program code, when loaded into the internal memory of a processing device, causes the processing device to:
review the portion of the real-time log data prior to and after the event archived at the second information level;
determine that the reviewed real-time log data archived at the second information level relates to the event; and
store knowledge gained from the determination.

20. The computer program product of claim 19 in a computer-readable medium comprising a computer storage medium having computer usable program code, wherein the computer usable program code, when loaded into the internal memory of a processing device, causes the processing device to:
correlate the reviewed real-time log data archived at the first information level relating to the event to the reviewed real-time log data archived at the second information level relating to the event;
store the log data at the first information level and the second information level relating to the event as symptoms of the event.

* * * * *